US006205846B1

(12) United States Patent
Dupraz et al.

(10) Patent No.: US 6,205,846 B1
(45) Date of Patent: Mar. 27, 2001

(54) METHOD OF DETERMINING WITH GREAT ACCURACY THE RATE OF LEAKAGE FROM THE CASE OF AN ELECTRICAL APPARATUS

(75) Inventors: Jean-Pierre Dupraz, Lyons; Edmond Thuries, Meyzieu, both of (FR)

(73) Assignee: GEC Alsthom T&D SA, Paris (FR)

(*) Notice: Subject to any disclaimer, the term of this patent is extended or adjusted under 35 U.S.C. 154(b) by 0 days.

(21) Appl. No.: 09/176,768

(22) Filed: Oct. 22, 1998

(30) Foreign Application Priority Data

Oct. 23, 1997 (FR) .................................................. 97 13289

(51) Int. Cl.[7] ............................. G01M 3/32; G08B 21/00

(52) U.S. Cl. ............................ 73/40; 73/30.01; 73/30.02; 340/605; 340/632; 340/635; 374/142; 374/143

(58) Field of Search ......................... 73/40, 23.28, 23.29, 73/30.01, 30.02; 340/605, 614, 626, 632, 635, 638; 374/142, 143

(56) References Cited

U.S. PATENT DOCUMENTS 3,934,454 * 1/1976 Simo .................................. 73/29.02
5,388,451 * 2/1995 Stendin et al. ...................... 73/30.02
5,502,435 3/1996 Ralston ................................ 340/632
5,693,873 * 12/1997 Thuries et al. ...................... 73/23.28

FOREIGN PATENT DOCUMENTS 0 637 114 A1 2/1995 (EP) .................................... 73/30.02
0 726 630 A1 8/1996 (EP) .................................... 73/23.28

* cited by examiner

*Primary Examiner*—Daniel S. Larkin
(74) *Attorney, Agent, or Firm*—Sughrue, Mion, Zinn, Macpeak & Seas, PLLC

(57) ABSTRACT

In the method, pairs of pressure and temperature values are recorded using a pressure sensor and a temperature sensor fixed to a case from the outside and communicating with a dielectric gas, thereby enabling a density value to be calculated for the dielectric gas corresponding to each recorded pair of values. Simultaneously with making the pressure and temperature records, an electric current flowing through an electrical apparatus located inside the case and a climate parameter relating to the medium in which the case is located are also recorded for the purpose of giving each density value an index, thereby enabling a leakage rate to be determined with improved accuracy on the basis of indexed leakage rates, each of which is obtained from density values all having the same index.

7 Claims, 3 Drawing Sheets

METHOD OF DETERMINING WITH GREAT ACCURACY THE RATE OF LEAKAGE FROM THE CASE OF AN ELECTRICAL APPARATUS

The invention relates to a method of determining a leakage rate from a series of density values for a dielectric gas contained under pressure in a case having disposed therein an electrical apparatus carrying an electric current, each density value being calculated by a recording-and-processor unit on the basis of corresponding pairs of pressure and temperature values delivered simultaneously by a pressure sensor and by a temperature sensor fixed on the case via the outside and communicating with the dielectric gas.

BACKGROUND OF THE INVENTION

A generator or a circuit breaker for a distribution network constitutes an application of such an electrical apparatus, in which the dielectric gas contained inside the case is sulfur hexafluoride $SF_6$, for example. $SF_6$ at a pressure of a few bars, either in the pure state or mixed with some other gas such as air or carbon tetrachloride $CCl_4$, is used to extinguish an electric arc that forms inside the case when the circuit breaker is opened.

The pressure sensor and the temperature sensor are mounted from the outside on the case and they communicate with the dielectric gas via a duct passing through the thickness of the case. Each record of pressure and temperature as measured simultaneously by the sensors can be used to calculate a density value that is representative of the real density of the dielectric gas contained in the case, to within the uncertainty of measurement error.

It is known that by measuring temperature simultaneously with pressure it is possible to apply temperature compensation to take account of the way pressure can decrease merely because the dielectric gas has contracted under the effect of a decrease in temperature, without there being any loss of mass or leakage of the dielectric gas from the case.

With the above-described method, it is possible to monitor mass losses of a few percent per annum. However, in the future, standards concerning protection of the environment may impose monitoring for leakage at a rate of one part per thousand per annum, particularly in respect of $SF_6$ or $CCl_4$.

On its own, temperature compensation turns out to be incapable of providing monitoring to that degree of accuracy, given that the pressure value as measured is corrected as a function of the temperature value as measured and not as a function of the real value of the temperature of the dielectric gas contained inside the case.

OBJECTS AND SUMMARY OF THE INVENTION

The object of the invention is to improve the accuracy with which the leakage rate of dielectric gas from the case of an electrical apparatus is measured.

To this end, the invention provides a method of determining a leakage rate from a series of density values for a dielectric gas contained under pressure in a case having disposed therein an electrical apparatus carrying an electric current, each density value being calculated by a recording-and-processor unit on the basis of corresponding pairs of pressure and temperature values delivered simultaneously by a pressure sensor and by a temperature sensor fixed on the case via the outside and communicating with the dielectric gas, wherein density value is indexed by the recording-and-processor unit as a function of a value for the electric current and of a value for a climate parameter concerning the medium in which the case is located, which values are recorded simultaneously with each corresponding pair of pressure and temperature values so as to enable the leakage rate to be determined from indexed leakage rates, themselves each obtained from density values all having the same index.

According to the invention, the electrical currents that flow through the electrical apparatus are recorded so that account can be taken of heat exchanged between the apparatus and the dielectric gas contained inside the case. Similarly, values for the climate parameter of the medium in which the case is located are also recorded so as to take account of heat exchanged between the medium and the temperature sensor fixed on the case.

Any difference between the real temperature of the dielectric gas and the temperature as measured by the sensor fixed to the case, e.g. due to a difference between the thermal inertias of the gas and of the temperature probe mounted in the sensor, remains substantially constant if it is generated by an electrical current that is substantially constant or by a climate parameter that is likewise substantially constant.

By recording an electric current value and a climate parameter value simultaneously with each pair of values corresponding to pressure and temperature, it is possible for the recording-and-processor unit to give a common index to the density values associated with electric current values that are similar to one another and with climate parameter values that are likewise similar to one another.

This gives rise to an indexed leakage rate, calculated on the basis of density values having the same index, which rate depends to a negligible extent on the substantially constant difference that exists between the real temperature of the dielectric gas and the temperature as measured by the sensor fixed on the case. Measurements based on indexed leakage rates are thus more accurate, as is the leakage rate obtained by averaging the indexed leakage rates.

BRIEF DESCRIPTION OF THE DRAWINGS

Other characteristics and advantages of the invention appear on reading the following description illustrated by the drawings.

DETAILED DESCRIPTION OF THE INVENTION

Figure 1:
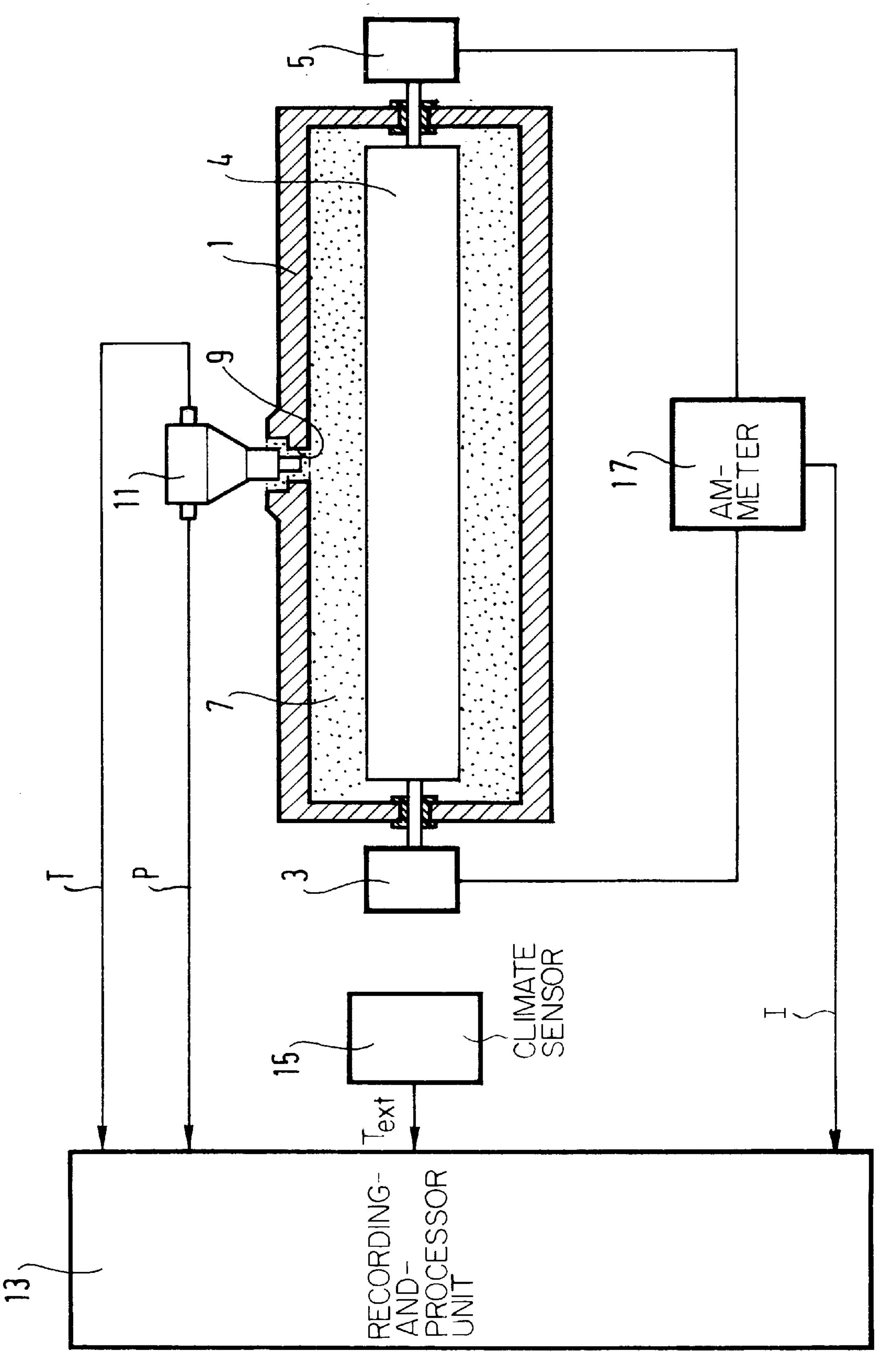
FIG. 1 is a block diagram showing an electrical apparatus on which the method of the invention is implemented.

An electrical apparatus, e.g. a circuit breaker, is represented in FIG. 1 in the form of a box 4 located inside a cylindrical case 1 filled with a dielectric gas such as $SF_6$ at a pressure of a few bars. The circuit breaker is connected to two current feeds 3 and 5.

A pressure sensor and a temperature sensor are fixed on the case from the outside. In the example of FIG. 1, the pressure sensor 11 is fitted with an internal temperature probe and does not require a second temperature sensor to be installed.

The pressure sensor communicates with the dielectric gas contained inside the case via a relatively narrow duct 9 which contains the temperature probe and a pressure detector, e.g. an elastic membrane.

The pressure sensor 11 supplies a recording-and-processor unit 13 with a pair of pressure and temperature values P and T that are acquired simultaneously. The pairs of values are recorded, e.g. every hour over a period of one year so as to form an annual series of records. It is also possible to record pressure and temperature value pairs in a sporadic manner during said period of time, e.g. on each occasion that a significant change occurs in the measured temperature. Each pair of values is processed by the recording-and-processor unit 13 to calculate a value for the density of the dielectric gas contained inside the case, e.g. by using an empirical equation of state as is known in the literature.

According to the invention, the method provides for simultaneously recording with each pair of pressure and temperature values, a value for the electric current flowing through the electrical apparatus, and a value for a climate parameter concerning the medium in which the enclosure is located.

In the example of FIG. 1, a first measurement apparatus 17 of the ammeter type is connected in parallel with the two current feeds 3 and 5 to supply the recording-and-processor unit 13 with a value I for the electrical current.

A second measurement apparatus 15 including a thermometer is disposed in the same ambient medium as the case 3, i.e. in general in atmospheric air, and it supplies the recording-and-processor unit 13 with a value for the air temperature $T_{ext}$.

The measurement apparatus 15 is also designed to measure other climate parameters of the ambient medium around the case 3, for example solar radiation falling on the case, atmospheric humidity, or wind speed, with the measurement apparatus 15 being fitted with sensors appropriate to each of those climate parameters.

The electric current and climate parameter values are processed by the unit 13 to give an index to each density value as calculated from each corresponding pair of pressure and temperature values.

Figure 2:
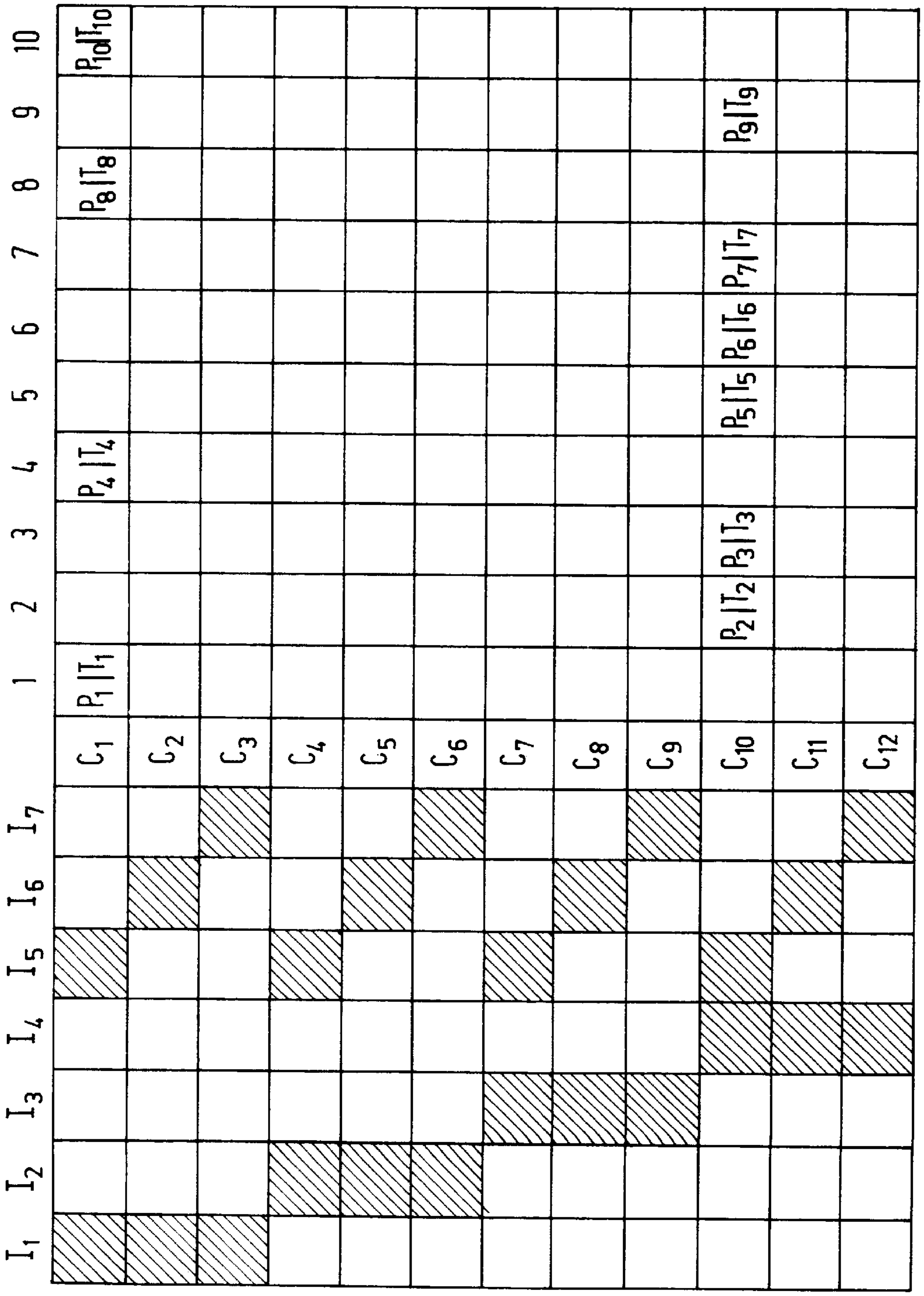
FIG. 2 shows a series of records obtained in application of the method of the invention.

FIG. 2 shows a series of n =10 records acquired by the unit 13, each record having a pair of values for pressure $P_n$ and temperature $T_n$, an electric current value, and an air temperature value.

An electric current value, in amps, is acceptable in any of the following four index ranges: $I_1$=[0, 500], $I_2$=[500, 1000], $I_3$=[1000, 1500], and $I_4$=[1500, 2000]. If the electric current value does not lie in any of those ranges, then the record is stored in a separate memory of the unit 13.

An outside temperature value, in degrees Celsius, is acceptable if it falls in one of the following three index ranges: $I_5$=[-10, 0], $I_6$=[0, 10], and $I_7$=[10, 20]. If the outside temperature does not lie in any of those ranges, then the record is stored in a separate memory of the unit 13.

An index is constituted by an electric current value index range associated with a climate parameter value index range. The four electric current value ranges and the three outside temperature ranges can be combined in pairs to form twelve distinct indices $C_1$, to $C_{12}$.

The four density values determined from records given numbers 1, 4, 8, and 10 are associated with four electric current values lying in the same first range $I_1$, and with four air temperature values lying in the same second range $I_5$. These four densities are all associated with the same index $C_1$ as defined by the range combination $I_1$, $I_5$.

The six density values determined by the records given numbers 2, 3, 5, 6, 7, and 9 are associated with six electric current values lying in the same first range $I_4$ and with six air temperature values lying in the same second range $I_5$. These six densities have the same index $C_{10}$ defined by the range combination $I_4$, $I_5$.

The example of FIG. 2 which has only one climate parameter is readily generalized to a plurality of climate parameters.

At the end of the series, or while the series is taking place if the number of records already acquired is sufficient, density values that have the same index are processed to calculate an indexed leakage rate $t_i$.

Figure 3:
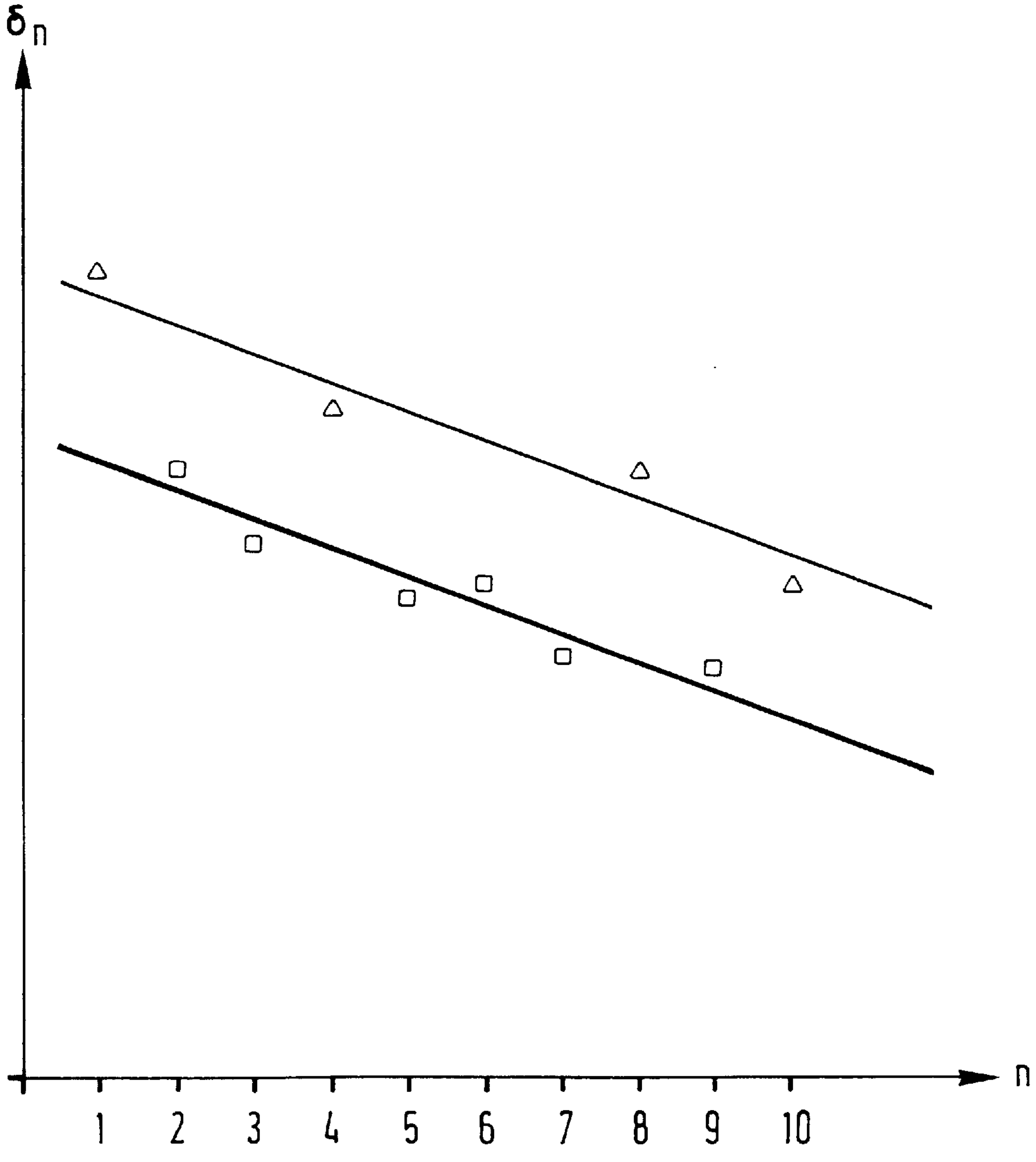
FIG. 3 shows two graphs for calculating an indexed leakage rate in application of the method of the invention.

FIG. 3 has density values plotted as a function of record number for the indices $C_1$ and $C_{10}$ shown in FIG. 2 and represented respectively by triangles and by squares. These values group together in two distinct sets both of which are substantially rectilinear. The recording-and-processor unit 13 performs linear regression on each set of same-index density values and calculates respective indexed leakage rates $\tau_1$, and $\tau_{10}$ based on the slopes of the respective lines.

It will be observed that the lines are substantially parallel to each other and that they are offset along the density axis. This offset represents two different values for the temperature differences between the temperature measured by the sensor and the real temperature of the dielectric gas, which temperature difference values are substantially constant for each of the lines even though they are different from one line to another. The fact that the lines are parallel demonstrates that any constant offset is of practically no effect on the indexed leakage rate as calculated on the basis of density values that all have the same index.

As a result the accuracy of the indexed leakage rates as measured and the accuracy of the overall leakage rate $\tau$ as obtained by averaging the indexed leakage rates, increase with narrowing index ranges for electric current climate parameter values.

What is claimed is:

1. A method of determining the leakage rate of a dielectric gas under pressure inside a case of an electrical apparatus, the method comprising:

performing, over a certain period of time, measurements of the temperature and of the pressure of the gas inside the case by means of a temperature sensor and a pressure sensor fixed on the case via the outside;

determining a series of density values for the gas on the basis of corresponding pairs of measured pressure and temperature values; and determining the leakage rate on the basis of said series of density values, wherein, simultaneously with measuring a pair of temperature and pressure values for the gas inside the casing, further comprising:

measuring a current passing through the apparatus located inside the casing, and a climate parameter concerning a medium in which the case is located, in order to select an index from a set of different indices and assign the selected index to the density value corresponding to said pair of measured temperature and pressure values, each index corresponding to an index range which contains the measured value of the current and to an index range which contains the measured value of the climate parameter, wherein on the basis of the density values having a same index, a leakage rate corresponding to said index is determined, and wherein on the basis of the leakage rates corresponding respectively to the different indices, the leakage rate of the gas from the case is determined.

2. The method of claim 1, wherein the medium in which the case is located comprises air, and wherein the climate parameter is the temperature of the air in which the case is located.

3. The method of claim 1, wherein the medium in which the case is located comprises air, and wherein the climate parameter is the solar radiation passing through the air in which the case is located.

4. The method of claim 1, wherein the medium in which the case is located comprises air, and wherein the climate parameter is the humidity of the air in which the case is located.

5. The method of claim 1, wherein the medium in which the case is located comprises air, and wherein the climate parameter is the wind speed of the air in which the case is located.

6. The method of claim 1, in which a leakage rate corresponding to an index is determined by performing linear regression on the density values corresponding to said index, and in which the leakage rate of the gas in the case is determined by taking the average of the leakage rates corresponding respectively to the different indices.

7. The method of claim 6, in which a recording-and-processor unit connected to said pressure and temperature sensor is used to determine the leakage rates corresponding to the respective indices, and to determine the overall leakage rate of the gas from the case, the recording-and-processor unit recording in memory, in a regular or a sporadic manner, each pair of measured temperature and pressure values, together with a current value and a climate parameter value.

* * * * *